United States Patent [19]
Hayashi et al.

[11] Patent Number: 5,714,033
[45] Date of Patent: Feb. 3, 1998

[54] HEAT-SEALING DEVICE FOR LIQUID-FILLED TUBE

[75] Inventors: Kojiro Hayashi; Fumiyuki Iwano; Micho Ueda, all of Tokushima, Japan

[73] Assignee: Shikoku Kakoi Co., Ltd., Tokushima, Japan

[21] Appl. No.: 611,667

[22] Filed: Mar. 6, 1996

[30] Foreign Application Priority Data

Mar. 8, 1995 [JP] Japan .................. 7-048244

[51] Int. Cl.⁶ .................................................. B32B 31/24
[52] U.S. Cl. .................. 156/380.5; 156/251; 156/308.4; 156/380.7; 156/380.8; 53/374.2; 53/451; 53/551; 53/DIG. 2
[58] Field of Search .................. 53/451, 374.2, 53/DIG. 2, 551; 156/69, 251, 380.8, 380.5, 308.4, 380.7

[56] References Cited

U.S. PATENT DOCUMENTS

| | | | |
|---|---|---|---|
| Re. 33,467 | 12/1990 | Steck et al. ............ | 53/DIG. 2 X |
| 3,679,509 | 7/1972 | Fielibert .................. | 53/374.2 X |
| 4,369,611 | 1/1983 | Canfeld .................... | 53/DIG. 2 X |
| 4,512,138 | 4/1985 | Greenawalt ................ | 53/451 |
| 4,546,596 | 10/1985 | Cherney .................... | 53/451 |
| 4,630,429 | 12/1986 | Christine .................. | 53/451 X |
| 5,067,302 | 11/1991 | Boeckmann ................ | 53/374.2 |
| 5,250,140 | 10/1993 | Hayashi et al. ............ | 156/380.8 X |
| 5,284,002 | 2/1994 | Fowler et al. ............. | 53/451 X |

FOREIGN PATENT DOCUMENTS

| | | | |
|---|---|---|---|
| 710061 | 5/1965 | Canada ................... | 53/451 |
| 1203584 | 1/1960 | France .................... | 53/451 |

Primary Examiner—Jeff H. Aftergut
Attorney, Agent, or Firm—Armstrong, Westerman, Hattori, McLeland & Naughton

[57] ABSTRACT

A heat-sealing device for liquid-filled tubes has a pair of openable pressing members 23, 24. One of the pressing members, 23, is provided in a pressing face 31 thereof with upper and lower two pressing pads 34, 35 extending in parallel to each other for pressing the tube T along and at respective opposite sides of each of the portions to be cut. The other pressing member 24 is provided in a pressing face 36 thereof with a U-shaped high-frequency coil 38 having upper and lower two straight portions 42, 43 extending in parallel to each other for heating the tube T along and at the respective sides of each portion to be cut. The pressing face 36 of the other pressing member 24 has upper and lower sealer portions 44, 45 each divided into a primary sealing portion 51, secondary sealing portion 52 and tertiary sealing portion 53. When the pressing members 23, 24 are closed, the primary sealing portions 51, 51 are parallel to the forward end faces of the pressing pads 34, 35 respectively, and the secondary sealing portions 52, 52 are so inclined as to gradually recede from the forward end faces of the respective pads 34, 35 as the sealing portions 52 extend outward.

3 Claims, 5 Drawing Sheets

HEAT-SEALING DEVICE FOR LIQUID-FILLED TUBE

BACKGROUND OF THE INVENTION

The present invention relates to a device for tubes filled with a beverage or like contents for heat-sealing the tube transversely thereof at an interval corresponding to the length of one container.

Such devices already known include, as disclosed in JP-A-4-154564, a heat-sealing device for a liquid-filled tube of a heat-sealable paper-based laminate having an aluminum foil layer. This device is adapted to heat-seal the tube at opposite sides of and along each of portions where the tube is to be subsequently cut transversely thereof into lengths each corresponding to one container. The device comprises a pair of openable pressing members, upper and lower pressing pads provided in a pressing face of one of the pressing members and extending in parallel to each other for pressing the tube at the respective opposite sides of and along each of the portions to be cut, and a U-shaped high-frequency coil provided in a pressing face of the other pressing member and having upper and lower straight portions, the straight portions extending in parallel to each other for heating the tube along and at the respective sides of the portion to be cut. The pressing face of the other pressing member is provided with upper and lower sealer portions to be pressed by the upper and lower pressing pads respectively when the pressing members are closed. The upper and lower sealer portions are each flat over the entire area thereof for forming a barlike seal and are so shaped as to be parallel to the forward end faces of a the upper and lower pads when the two pressing members are closed.

With the conventional device described, the upper and lower sealer portions are respectively in parallel to the forward end faces of the upper and lower pressing pads, so that each sealer portion is subjected to a uniform pressure over the entire area at the same time.

To assure such a device of a satisfactory heat-sealing operation, there is a need to smoothly remove liquid from a seal region of the tube when the tube is pressed, whereas the inner surface of the tube is not always perfectly flat but has very small irregularities. Accordingly, when the tube is pressed with the uniform pressure in the manner described above, the liquid trapped by the surface irregularities can not be removed, and the liquid remaining in the seal region causes a fault in the seal.

SUMMARY OF THE INVENTION

An object of the present invention is to overcome the above problem and provide a heat-sealing device for liquid-filled tubes which is adapted to smoothly remove liquid from the seal region of the tube when pressing the tube so as to ensure perfect heat sealing.

The present invention provides a heat-sealing device for a liquid-filled tube of heat-sealable paper-based laminate having an aluminum foil layer, the heat-sealing device being adapted to heat-seal the tube at opposite sides of and along each of portions where the tube is to be subsequently cut transversely thereof into lengths each corresponding to one container, the heat-sealing device comprising a pair of openable pressing members, upper and lower pressing pads provided in a pressing face of one of the pressing members and extending in parallel to each other for pressing the tube along said each portion at the respective opposite sides thereof, and a U-shaped high-frequency coil provided in a pressing face of the other pressing member and having upper and lower straight portions, the straight portions extending in parallel to each other for heating the tube along said each portion at the respective sides thereof, the pressing face of the other pressing member being provided with upper and lower sealer portions to be pressed by the upper and lower pressing pads respectively when the pressing members are closed, the heat-sealing device being characterized in that the upper sealer portion is divided into a primary sealing portion below an intermediate level of its height and a secondary sealing portion above the level, the lower sealer portion being divided into a primary sealing portion above an intermediate level of its height and a secondary sealing portion below the level, the primary sealing portions of the upper and lower sealer portions being so shaped as to be parallel to the forward end faces of the upper and lower pressing pads respectively when the pressing members are closed, the secondary sealing portions of the upper and lower sealer portions being inclined in a direction to gradually recede from the forward end faces of the upper and lower pressing pads respectively as the sealing portions extend outward when the pressing members are closed.

Preferably, the secondary sealing portions have an inclination of 4 to 10 degrees.

A ridge may be provided at a required portion of the boundary between the primary sealing portion and the secondary sealing portion of each of the upper and lower sealer portions.

With the liquid-filled tube heat-sealing device of the invention, the upper sealer portion is divided into a primary sealing portion below an intermediate level of its height and a secondary sealing portion above the level, the lower sealer portion is divided into a primary sealing portion above an intermediate level of its height and a secondary sealing portion below the level, the primary sealing portions of the upper and lower portions are parallel to the forward end faces of the upper and lower pressing pads respectively when the pressing members are closed, and the secondary sealing portions of the sealing portions are so inclined as to gradually recede from the forward end faces of the pressing pads respectively as these sealing portions extend outward when the pressing members are closed. Consequently, when the tube is pressed, the tube portion to be made into an outward container part is subjected to a high pressure by the primary sealing portion included in each of the upper and lower sealer portions, and the tube portion to be made into an inward container part is then pressed by the secondary sealing portion with a pressure gradually decreasing from outside inward.

When the tube is heated for sealing after the application of pressure thereto, the liquid remaining between the opposed portions of inner resin coating and molten resin can therefore be smoothly removed from the seal region of the tube, permitting the tube to be heat-sealed flawlessly with no liquid remaining in the primary seal region.

When the secondary seal region of the tube is less than 4 degrees in inclination, the secondary sealing portions fail to fully remove the liquid, whereas if the inclination exceeds 10 degrees, the secondary sealing portions effect marked liquid removal, allowing the primary sealing portions only to produce a sealing effect. When having an inclination of 4 to 10 degrees, the secondary seal region can be subjected to a suitable pressure.

As a result, molten resin and a very small amount of liquid remaining between the opposed portions of inner resin coating flow, enabling the first sealing portions to produce a flawless seal.

Further when a ridge is provided at a required portion of the boundary between the primary sealing portion and the secondary sealing portion of each of the upper and lower sealer portions, the ridge presses the seal region before the application of pressure by the sealing portions.

Accordingly, extraneous matter can be removed from the seal region beforehand.

DESCRIPTION OF THE PREFERRED EMBODIMENT

An embodiment of the invention will be described next with reference to the drawings.

Figure 1:
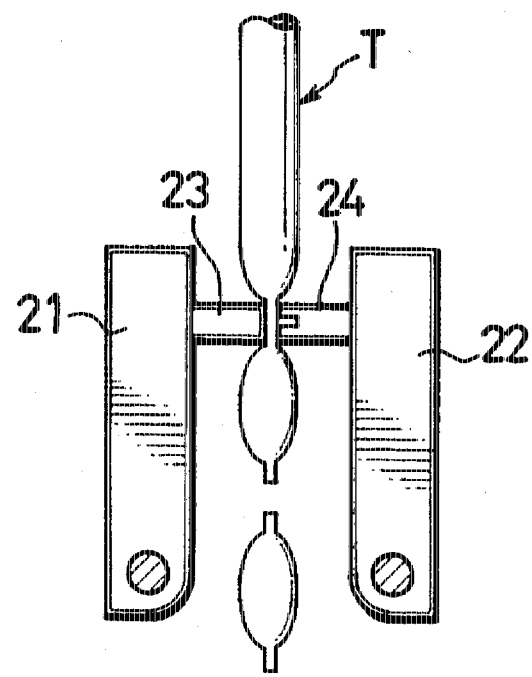
FIG. 1 is a front view schematically showing a device embodying the invention.

FIG. 1 shows a tube T, which is formed by lapping the inner surface of one of opposite edge portions of a web W (FIG. 2) over the outer surface of the other edge portion and heat-sealing the lap. The tube T is filled with a beverage.

Figure 2:
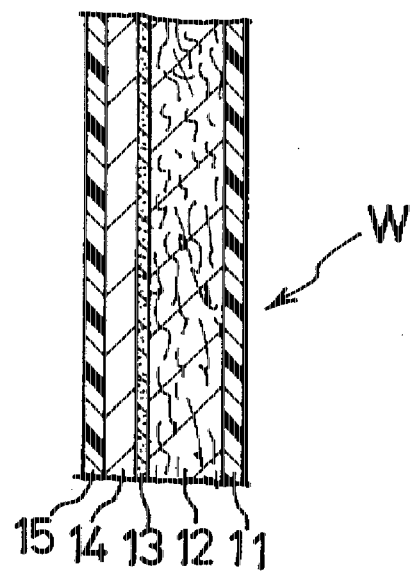
FIG. 2 is a diagram showing the construction of the tube to be sealed by the device of the invention.

With reference to FIG. 2, the web W comprises an outer polyethylene layer 11, paper layer 12, adhesive layer 13, aluminum foil layer 14 and inner polyethylene layer 15 which are arranged in this order from one side of the web serving as the outer side of containers and which are united into a laminate.

The heat-sealing device illustrated is adapted to heat-seal the tube T, as positioned below a liquid level, transversely thereof at an interval corresponding to the length of one container, and comprises a pair of left and right arms 21, 22 which are pivotally movable, and openable left and right pressing members 23, 24 opposed to each other and fixed to upper portions of the respective arms.

Figure 3:
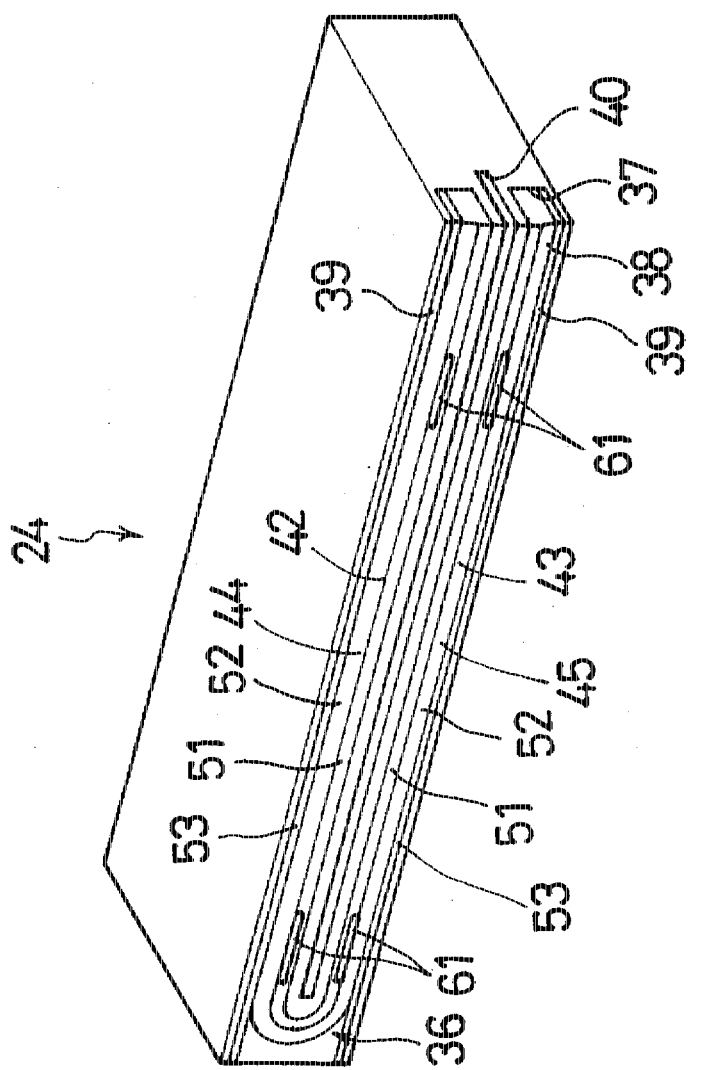
FIG. 3 is a perspective view of two pressing members of the device of the invention.
Figure 3:
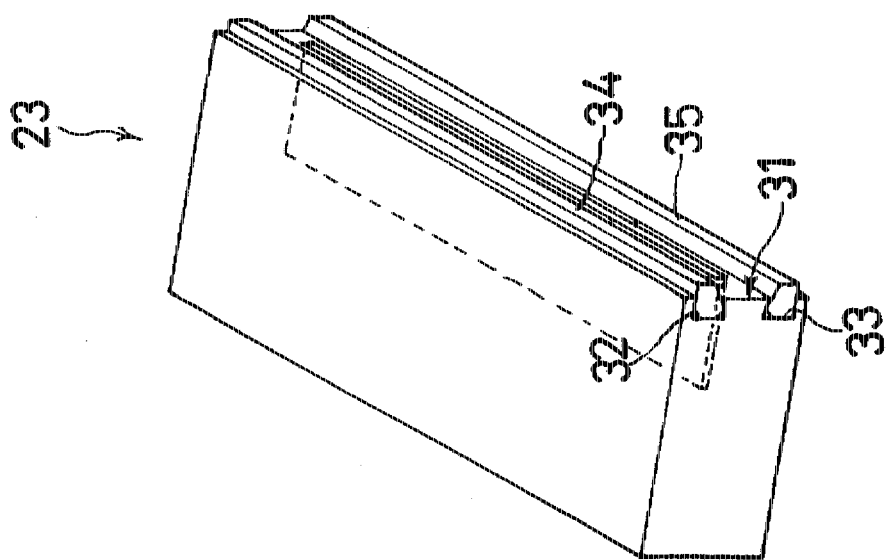

With reference to FIG. 3, the left pressing member 23 has a pressing face 31 which is formed with a pair of upper and lower horizontal grooves 32, 33 extending in parallel to each other. Upper and lower pressing pads 34, 35 of rubber are fitted in the respective grooves with their forward ends projecting beyond the pressing face. Although not shown, a cutter is provided on the left pressing member 23 for cutting the tube T simultaneously with sealing. The right pressing member 24 has a pressing face 36 formed with a U-shaped groove 37, which has fitted therein a U-shaped high-frequency coil 38 of copper and two striplike magnetic bodies 39 of ferrite. A cutter recess 40 is formed in the pressing face 36 between the straight portions of the U-shaped groove 32.

Figure 4:
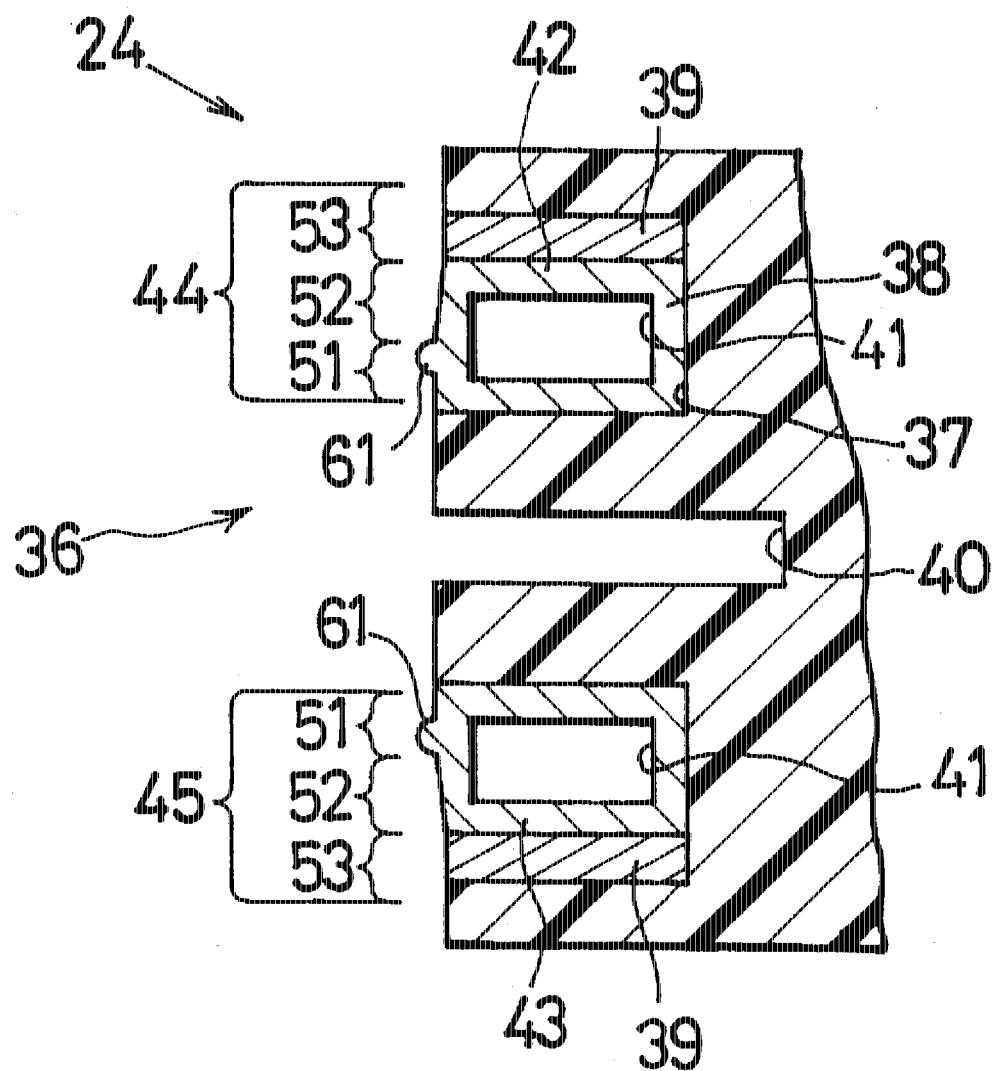
FIG. 4 is a sectional view showing one of the pressing members of the device of the invention.

Referring to FIG. 4, the high-frequency coil 38 is in the form of a tube having a rectangular cross section with its interior space serving as a cooling water channel 41. The coil 38 has a pair of upper and lower straight portions 42, 43 extending in parallel to each other. The straight portions 42, 43 each have a side face flush with the pressing face 36 of the right pressing member 24.

Figure 5:
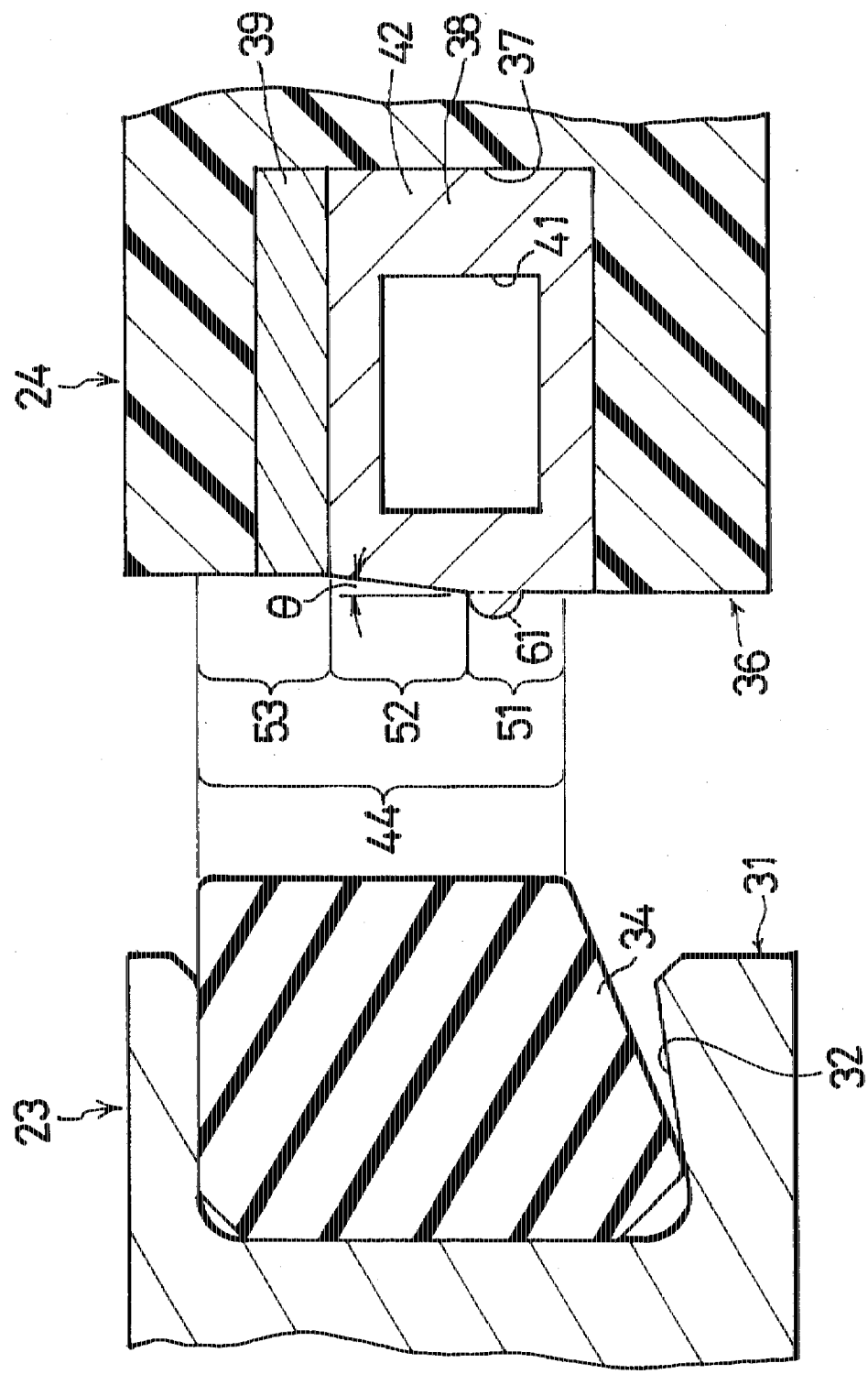
FIG. 5 is an enlarged fragmentary view in section of the two pressing members of the device of the invention.

As shown in greater detail in FIG. 5, the pressing face 36 of the right pressing member 24 has an upper sealer portion 44 in the vicinity of the upper straight portion 42 of the high-frequency coil 38. This portion 44 is pressed by the forward end face of the upper pressing pad 34 when the pressing members 23, 24 are moved toward each other. The upper sealer portion 44 is divided into a primary sealing portion 51, secondary sealing portion 52 and tertiary sealing portion 53 as arranged upwardly from below. The upper sealer portion 44 is substantially equally divided into these three sealing portions 51 to 53. The primary and tertiary sealing portions 51 and 53 are vertical in FIG. 5, whereas the secondary sealing portion 52 is inclined at a predetermined angle θ with respect to a vertical. When the pressing members 23, 24 are closed, therefore, the primary and tertiary sealing portions 51, 53 are parallel to the forward end face of the upper pressing pad 34, and the secondary sealing portion 52 is so inclined as to gradually recede from the forward end face of the pad 34 as the sealing portion 52 extends outwardly. The angle of inclination θ of the secondary sealing portion 52, which is 7 degrees, is suitably variable over the range of 4 to 10 degrees.

Referring to FIG. 4 again, the pressing face 36 of the right pressing member 24 has a lower sealer portion 45 in the vicinity of the lower straight portion 43 of the high-frequency coil 38. The lower sealer portion 45 is also divided into a primary sealing portion 51, secondary sealing portion 52 and tertially sealing portion 53. However, these divided portions are arranged successively from above downward in reverse relation to those of the upper sealer portion 44.

The straight portions 42, 43 are formed, each on one side face thereof, with two pairs of ridges 61 in the vicinity of their respective opposite ends. These pairs are spaced apart by a distance slightly smaller than the width of the tube T as collapsed to a flat form. These ridges 61 serve to press the tube with an increased pressure for sealing at its respective side edge parts thereof. The ridge 61 is positioned at an edge of the primary sealing portion 51 and adjoins the secondary sealing portion 52.

For example, the ridges 61 have the following dimensions. When the tube in a flat form is 102 mm in width and 0.4 mm in thickness, the ridges 61 are 10 mm in length, and the ridges 61 on the respective upper and lower straight portions 42, 43 are spaced apart by 88 mm. The ridges 61 are 0.6 mm in width and 0.2 mm in height and have a circular-arc contour in cross section.

The ridges 61 are not limited to the above specific example but are variable from 6 mm to 12 mm in length. The thickness of the tube is variable over the range of 0.2 mm to 0.5 mm. Assuming that the tube has a thickness t, the ridges 61 are variable from 0.8 t to 2 t in width and from 0.02 t to 0.08 t in height.

The magnetic bodies 39 are rectangular in cross section, have a width equal to the depthwise dimention of the coil 38 and a thickness approximately equal to ⅓ of the width, and extend along the respective straight portions 42, 43 of the coil 38 on the outer side thereof.

Figure 6:
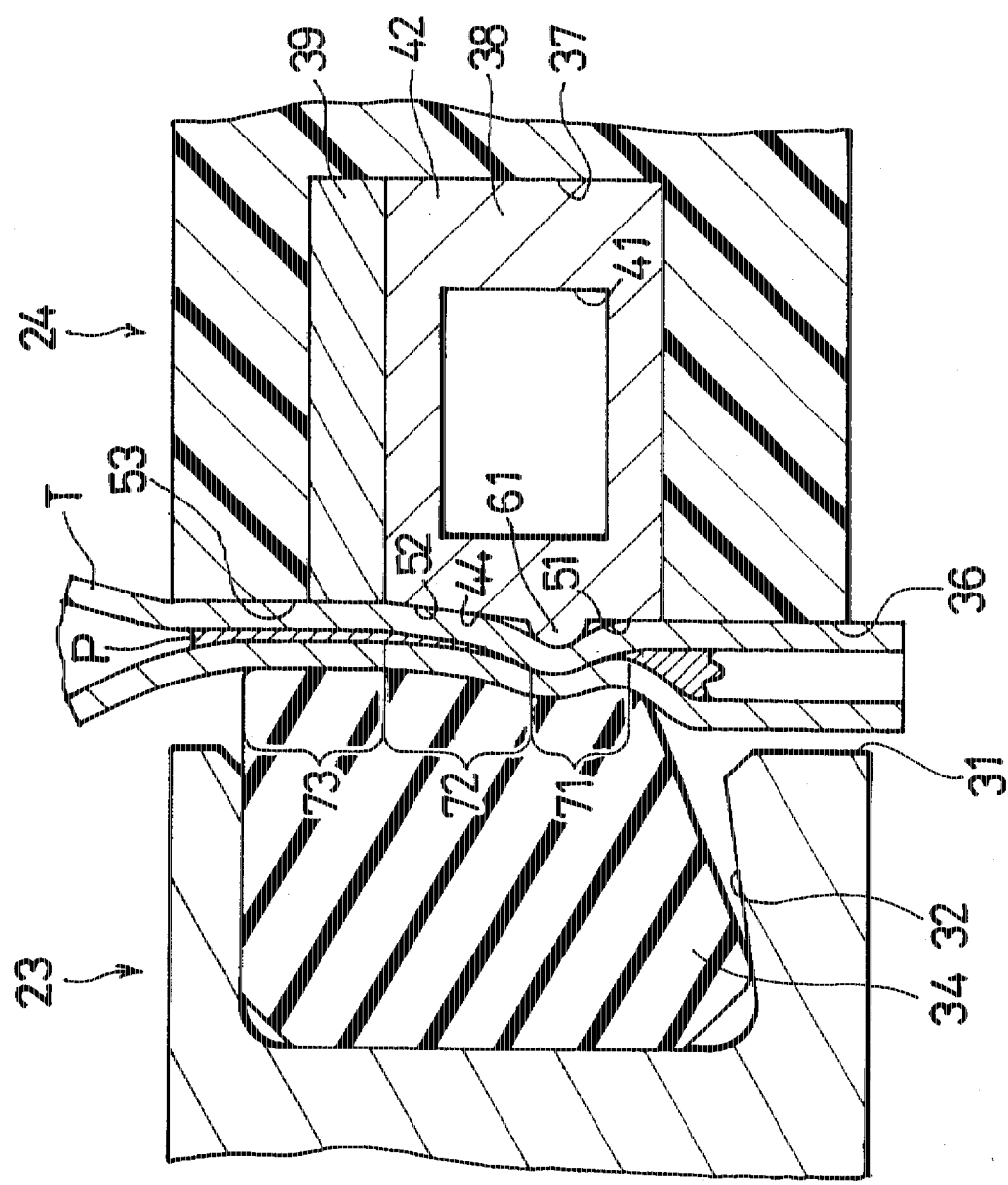
FIG. 6 is a diagram for illustrating a sealing operation.

The sealing operation of the device will be described in detail with reference to FIG. 6. When the opposed pressing members 23, 24 are closed for sealing, the ridges 61 press the opposite edges of the tube T first, and the primary, secondary and tertiary sealing portions 51, 52, 53 apply pressure to the tube T, the pressure gradually decreasing from portion to portion. The tube T is heated in this state, whereupon melted polyethylene P present at the location of each of the sealer portions 44, 45 is forced toward the tube portions to be made respectively into inward and outward parts of the container to be formed, eventually providing a primary seal region 71, secondary seal region 72 and tertiary seal region 73 corresponding to the primary, secondary and tertiary sealing portions 51, 52, 53, respectively. When the tube is sealed, a seal free from any extraneous matter is formed in the primary seal region 71, and a seal containing extraneous matter in the secondary and tertiary seal regions 72, 73. However, some extraneous matter may remain in the portion of the primary seal region 71 remote from the ridge 61 (i.e., lower portion of the seal region 71 shown in FIG. 6).

The tertiary sealing portion 53, although parallel to the primary sealing portion 51 in the foregoing embodiment, may alternately be inclined at the same angle with the secondary sealing portion 52 so as to extend from the secondary sealing portion 52 straightforwardly.

What is claimed is:

1. A heat-sealing device for a liquid-filled tube of a heat-sealable paper-based laminate having an aluminum foil layer, said heat-sealing device being adapted to heat-seal said tube at opposite sides of and along each of portions where said tube is to be subsequently cut transversely thereof into lengths each corresponding to one container, said heat-sealing device comprising:

first and second operable pressing members;

upper and lower pressing pads provided in a pressing face of said first pressing member, and extending in parallel to each other, for pressing said tube along said each portion at said opposite sides thereof;

a U-shaped high-frequency coil, provided in a pressing face of said second pressing member and having upper and lower straight portions extending in parallel to each other, for heating said tube along said each portion at said opposite sides thereof;

said pressing face of said second pressing member being provided with upper and lower sealer portions to be pressed by said upper and lower pressing pads, respectively, when said first and second pressing members are closed; and wherein said upper sealer portion is divided into a primary sealing portion below an intermediate level of a height of said upper sealer portion and a secondary sealing portion above said intermediate level of said height of said upper sealer portion, said lower sealer portion being divided into a primary sealing portion above an intermediate level of a height of said lower sealer portion and a secondary sealing portion below said intermediate level of said lower sealer portion, said primary sealing portions of said upper and lower sealer portions being shaped so as to be parallel with forward end faces of said upper and lower pressing pads, respectively, when said first and second pressing members are closed, said secondary sealing portions being inclined in a direction to gradually recede from said forward end faces of said upper and lower pressing pads, respectively, as said secondary sealing portions extend outwardly when said first and second pressing members are closed.

2. The heat-sealing device as defined in claim 1 wherein said secondary sealing portions have an angle of inclination of 4 to 10 degrees.

3. The heat-sealing device as defined in any one of claim 1 and 2, wherein a ridge is provided at a required portion of a boundary between said primary sealing portions and said secondary sealing portions of each of said upper and lower sealer portions.

* * * * *